Dec. 22, 1936.  L. G. SIMPSON  2,065,103
LENS GRINDING MACHINE
Filed Nov. 1, 1935  3 Sheets-Sheet 2

LEON G. SIMPSON
INVENTOR
BY
ATTORNEYS

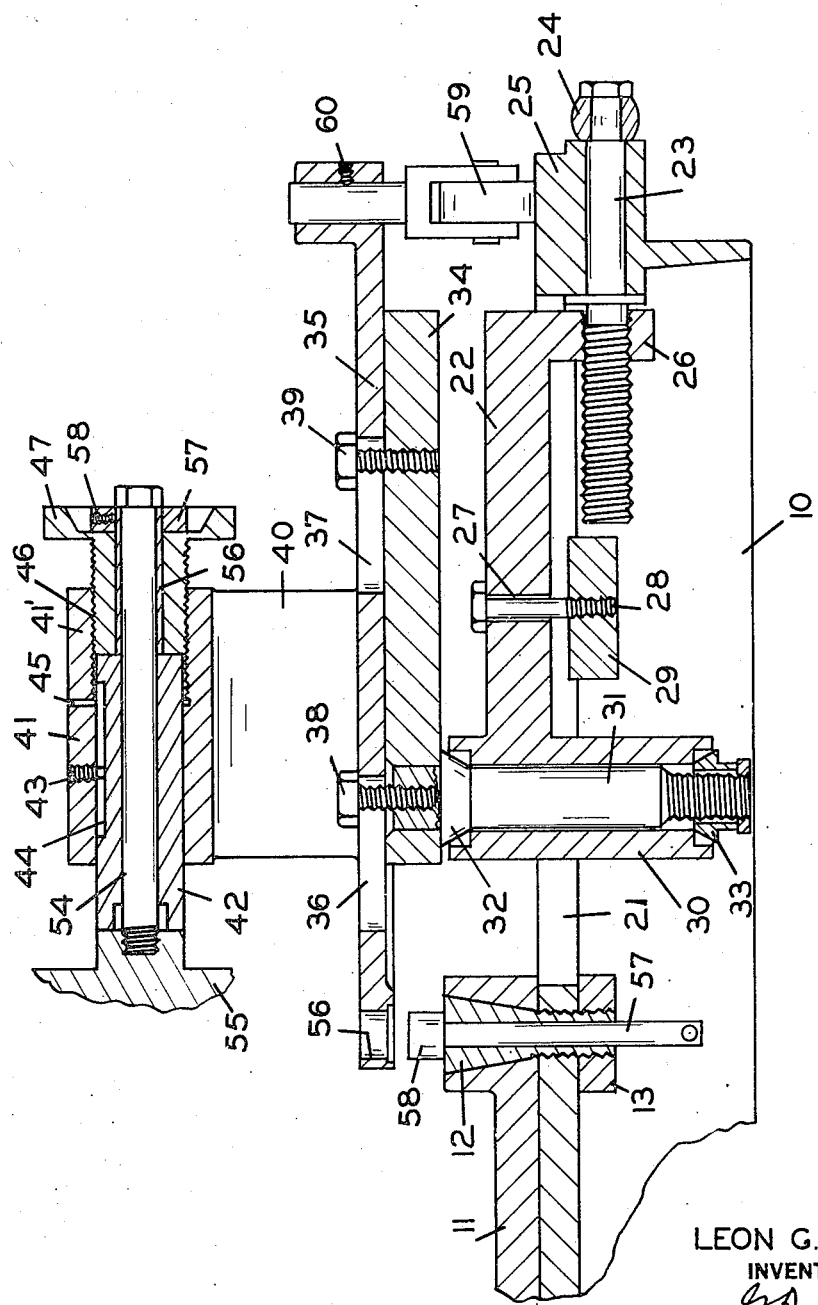

Patented Dec. 22, 1936

2,065,103

UNITED STATES PATENT OFFICE 2,065,103

LENS GRINDING MACHINE

Leon G. Simpson, Rochester, N. Y., assignor to Bausch & Lomb Optical Company, Rochester, N. Y., a corporation of New York Application November 1, 1935, Serial No. 47,837

6 Claims. (Cl. 51—124)

The present invention relates to lens grinding machines and more particularly to machines for grinding toric or spherical surfaces on a lens.

One of the objects of the present invention is to provide a rugged and simple but efficient machine for grinding a toric or spherical surface on a lens. Another object is to provide a machine for grinding toric or spherical surfaces, which machine has a minimum of moving parts and adjustments. A further object is to provide, in a machine of the type described, an improved means for positioning a lens blank and for moving it against an abrading tool. These and other objects and advantages reside in certain novel features of construction, arrangement and combination of parts as will hereinafter be more fully set forth and pointed out in the appended claims.

Referring to the drawings:

Fig. 3 is an enlarged, fragmentary vertical section through the lens support.

Figure 1:
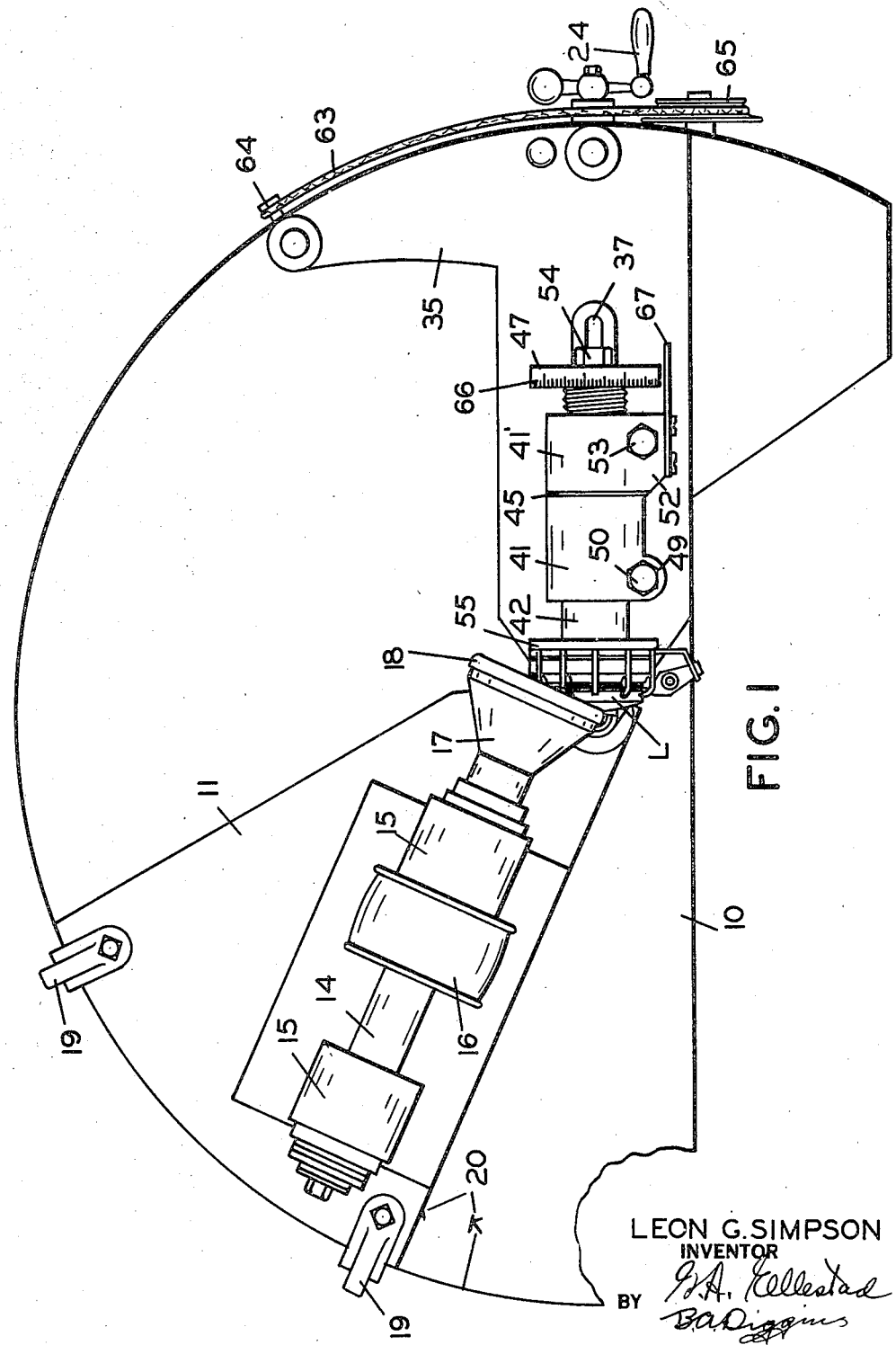
Fig. 1 is a plan view of my improved lens grinding machine.
Figure 2:
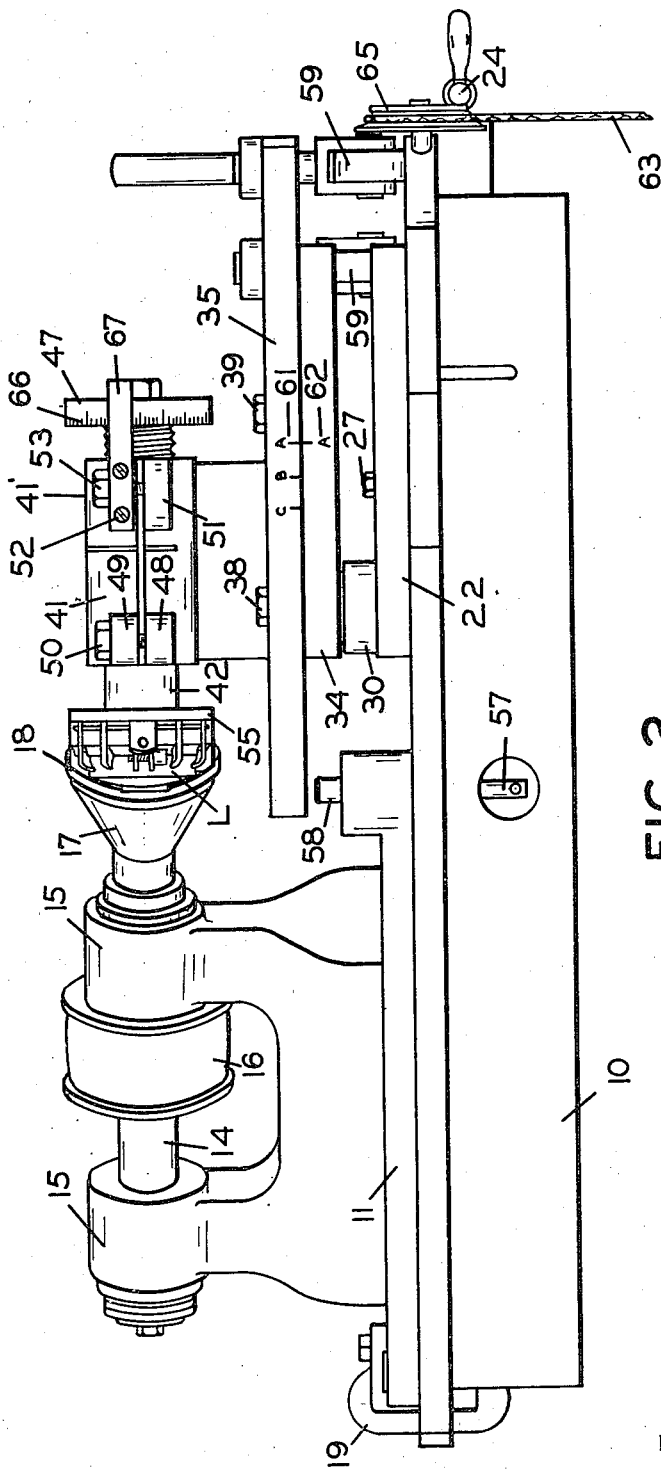
Fig. 2 is a side elevation thereof.

A preferred embodiment of this invention is illustrated in the drawings wherein 10 indicates a base, upon which a plate 11 is mounted for pivotal movement about a tapered bearing member 12 fixed to the base 10 by a nut 13. A spindle 14 is rotatably journalled in bearings 15 mounted on the plate 11, so that it may be rotated by a belt or other means through the pulley 16. A conical abrading tool 17 having an arcuate grinding edge 18 is fixed on the spindle 14 in such position, that the axis about which the plate 11 pivots, passes through the center of curvature of the arcuate grinding edge 18. The plate 11 and abrading tool 17 can thus be pivoted about an axis passing through the center of curvature of the arcuate grinding edge 18 and the plate 11 may be fixed in any desired position by clamps 19. The angular position of the abrading tool 17 determines the curvature of the lens blank in one meridian and the tool can be set to grind the desired curve by means of the indicia 20 on the base 10.

The base 10 is provided with a slot 21 extending radially from the bearing 12, and a slide 22 is mounted for sliding movement in the slot 21. A screw 23, under the control of a handle 24, is rotatably journalled in a bearing 25 in the wall of the base 10 and is threaded into an extension 26 on the slide 22. Thus rotation of the handle 24 and screw 23 will move the slide 22 toward or from the bearing 12. The slide 22 has a hole 27 through which extends a bolt 28 which is threaded into a clamping bar 29. As can be seen from Fig. 3, the slide 22 may be clamped in any desired position by turning the bolt 28 to draw the clamping bar 29 tightly against the base 10.

At the end toward the bearing 12, the slide 22 has a hollow bearing 30 within which is rotatably journalled a stub shaft 31, held against axial movement by caps 32 and 33. A plate 34 is secured on the upper end of the stub shaft 31 and a bracket 35 is slidably mounted on the plate 34. The bracket 35 has two aligned slots 36 and 37 through which bolts 38 and 39, respectively, are threaded into the stub shaft 31 and the plate 34 respectively. Tightening of the bolts 38 and 39 fixes the bracket 35 with reference to the plate 34 and stub shaft 31.

The bracket 35 has an upstanding portion 40 which carries at its upper end a longitudinally split tube 41 in which a seating member 42 is slidable but is held against rotation by a key 43 extending into a keyway 44 in the seating member 42. The tube 41 also has a transverse slot 45 and the rear portion 41' of the tube 41 has a threaded portion 46 for receiving a screw 47. The tube 41 has lugs 48 and 49 on opposite sides of the split and a bolt 50 serves to draw the split together to clamp the seating member 42 therein. Similar lugs 51 and 52 and a bolt 53 serve to clamp the screw 47 in the rear portion 41' of the tube 41.

The seating member 42 and the screw 47 have aligned axial holes therethrough and a bolt 54 extends through these holes and is threaded into a lens holding chuck 55. A bearing sleeve 56 surrounds the bolt 54 within the screw 47 and a ring 57, secured to the sleeve 56 by a set screw 58, is positioned within a countersink 59 in the screw 47. From Fig. 3, it can be seen that the bolt 54 draws the chuck 55 tightly against the seating member 42 and that the chuck can be moved axially by rotating the screw 47.

The lens holding chuck 55 is preferably of the type described and claimed in my copending application Serial No. 264 filed January 3, 1935 entitled "Method and apparatus for positioning multifocal lens blanks", and, when multifocal blanks are to be ground, the lens blank L is preferably positioned as taught by that application. The use of my invention is not, however, restricted to the grinding of multifocal lens blanks.

The bracket 35 has an opening 56 at its forward end and a plunger 57, having an enlarged head 58, is vertically slidably journalled in the fixed bearing member 12, for movement along the pivotal axis of the plate 11. The rear end of the bracket 35 has one or more rollers 59 secured to it by a set screw 60 and bearing against the table 10 to reduce friction to a minimum.

As stated above, the curve formed in one meridian of the lens L by the tool 17 is determined by the angular setting of the tool. The lens L is moved against the grinding tool 17 by swinging the plate 34 and bracket 35 about the stub shaft 31 and hence the curvature in the other meridian is determined by the distance between the axis of the bearing 12 and the axis of the stub shaft 31.

In operation, the plate 11 is moved until the indicia 20 indicate the horizontal curvature desired. A chuck 55 holding a lens L is then fixed against the seating member 42 and the plunger 57 raised until the enlarged head 58 engages in the opening 56 in the bracket 35. The bolts 27, 38 and 39 are loosed and the screw 23 rotated by the handle 24 causing the slide 22 carrying the stub shaft 31 to be moved toward or from the bearing 12. The curve to be formed by swinging the lens about the stub shaft 31 is indicated by the scale 61 on the bracket 35 and the index 62 on the plate 34. When the proper curve is indicated, the bolts 27, 38 and 39 are tightened and the head 58 of the plunger 57 is lowered out of engagement with the opening 56. Obviously, when scales 61 and 20 indicate the same curvature, the surface will be a sphere. The lens L is then moved against the tool 17 by a cord or wire 63 which is attached to a pin 64 on the bracket 35 and runs over a pulley 65 to a weight not shown. The depth of glass to be removed from the lens L is regulated by the screw 47 which moves the chuck 55 toward and from the cutting tool 17 and the amount can be set by means of the scale 66 on the screw 47 cooperating with an index plate 67 on the tube 41.

The improved grinding machine according to this invention is especially useful in grinding multifocal lens blanks of the type referred to in my above-mentioned copending application. The lens blanks are positioned in the chuck 55 with reference to the composite surface only and the composite surface is always a fixed distance from the rear end of the chuck 55 which engages the seating member 52. With a multifocal lens mounted in such a way, the scale 66 can be made to indicate the exact thickness or size of the multifocal segment to be had after grinding. When grinding such lenses, obviously locating means, such as a pin and slot, can be used for radially positioning the chuck 55 on the seating member 42.

From the foregoing, it will be apparent that I am able to attain the objects of my invention and provide a simple and rugged yet accurate machine for grinding spherical or toric surfaces on lenses. Various modifications can, of course, be made without departing from the spirit of my invention or the scope of the appended claims.

I claim:

1. In a lens grinding machine, a grinding element, a base, a lens holding member, means for pivotally supporting said lens holding member, means for slidably supporting said pivotal supporting means, means for sliding said slidable supporting means and means for retaining said lens holding member at a predetermined distance from said grinding element during movement of said slidable supporting means.

2. In a machine of the character described a base, a slide slidably mounted on said base, means for moving said slide, a plate pivotally carried by said slide, a bracket slidably mounted on said plate, lens holding means on said bracket for securing a lens in fixed predetermined position, and means for holding said base and said bracket in fixed relation when said slide is being moved by the slide moving means.

3. In a lens grinding machine, a base, a grinding element carried by said base, a slide slidably mounted on said base, means for moving said slide, a plate pivotally carried by said slide, a bracket slidably mounted on said plate, lens holding means on said bracket for securing a lens in fixed, predetermined position and means for holding said bracket in fixed relation to said grinding element during movement of said slide by the slide moving means.

4. In a lens grinding machine, a base, a grinding element carried by said base, a slide slidably mounted on said base, means for moving said slide, a plate pivotally carried by said slide, a bracket slidably mounted on said plate, lens holding means on said bracket for securing a lens in fixed, predetermined position, and releasable interconnecting means on said base and on said bracket, for holding said bracket in fixed relation to said grinding element during movement of said slide by said slide moving means.

5. In a lens grinding machine, a base, a grinding element mounted on said base, a slide slidably mounted on said base, means for moving said slide, a plate, pivot means for swingably securing said plate to said slide, a bracket slidably mounted on said plate, a lens holder mounted on said bracket, releasable means for holding said lens holder in fixed relation to said grinding element during movement of said slide, means for clamping said slide to said base, means for clamping said bracket to said plate and means for swinging said lens holder, bracket and plate about said pivot to bring a lens against the grinding element.

6. In a lens grinding machine, a base, a grinding element mounted on said base and having an edge for grinding a lens, a slide slidably mounted on said base, means for moving said slide, a plate, pivot means for securing said plate to said slide, a bracket slidably mounted on said plate, a lens holder mounted on said bracket, a pin slidably mounted in said base directly below the grinding edge of said grinding element, a hole in said bracket to receive the pin to retain the lens holder in predetermined relation to said grinding element during movement of said slide, means for removing said pin from said hole, means for clamping said slide to said base, means for clamping said bracket to said plate and means for swinging said lens holder, bracket and plate about said pivot to bring a lens against the grinding element.

LEON G. SIMPSON.